United States Patent
Mori

(10) Patent No.: US 10,823,900 B2
(45) Date of Patent: Nov. 3, 2020

(54) VEHICULAR LAMP WITH ELONGATED LIGHT GUIDE PORTIONS

(71) Applicant: STANLEY ELECTRIC CO., LTD., Tokyo (JP)

(72) Inventor: Kentaro Mori, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/519,373

(22) Filed: Jul. 23, 2019

(65) Prior Publication Data

US 2020/0025995 A1    Jan. 23, 2020

(30) Foreign Application Priority Data

Jul. 23, 2018  (JP) ................................ 2018-137948

(51) Int. Cl.
F21V 8/00        (2006.01)
F21S 41/36      (2018.01)

(52) U.S. Cl.
CPC ............ G02B 6/0055 (2013.01); F21S 41/36 (2018.01)

(58) Field of Classification Search
CPC ............. F21S 41/36; F21S 43/235–239; F21S 43/245; G02B 6/0018; G02B 6/002; G02B 6/0028; G02B 6/0055
See application file for complete search history.

(56) References Cited

U.S. PATENT DOCUMENTS

| 5,700,078 A | 12/1997 | Fohl et al. |
| 2009/0219731 A1* | 9/2009 | Martin ................. F21S 43/249 362/509 |
| 2012/0314448 A1* | 12/2012 | Nakada ................. F21S 43/237 362/602 |
| 2013/0003397 A1 | 1/2013 | Buisson |

(Continued)

FOREIGN PATENT DOCUMENTS

| DE | 10 2007 013 082 A1 | 9/2008 |
| DE | 10 2011 051 978 A1 | 1/2013 |

(Continued)

OTHER PUBLICATIONS

Extended European Search Report for the related European Patent Application No. 19187768.7 dated Dec. 11, 2019.

*Primary Examiner* — Evan P Dzierzynski
*Assistant Examiner* — Keith G. Delahoussaye
(74) *Attorney, Agent, or Firm* — Kenealy Vaidya LLP

(57) ABSTRACT

A vehicular lamp includes a light guide body, including first and second light guide portions, disposed side by side, a light incident portion, a first reflective surface, and a second reflective surface. The first and second reflective surfaces are disposed between the light incident portion and the proximal end portion of the first or second light guide portion, respectively. Light reflected by the first reflective surface is guided in the first light guide portion while being repeatedly reflected between the front and back surfaces thereof, and light reflected by the second reflective surface is guided in the second light guide portion while being repeatedly reflected between the front and back surfaces thereof. The back surfaces of the light guide portions include a plurality of first or second structures, respectively, configured to cause the light guided in the first or second light guide portion to exit from the front surface thereof.

15 Claims, 6 Drawing Sheets

(56) References Cited

U.S. PATENT DOCUMENTS

| | | | |
|---|---|---|---|
| 2013/0128620 A1* | 5/2013 | Kosuge | G02B 6/0036 |
| | | | 362/623 |
| 2014/0160778 A1 | 6/2014 | Nakada | |
| 2014/0211493 A1* | 7/2014 | Ichikawa | G02B 6/0001 |
| | | | 362/511 |
| 2017/0241616 A1 | 8/2017 | Nakashima et al. | |
| 2019/0049088 A1* | 2/2019 | Sakashita | G02B 6/0035 |
| 2019/0078747 A1* | 3/2019 | Wu | G02B 27/0905 |
| 2019/0285791 A1* | 9/2019 | Gloss | G02B 6/0031 |

FOREIGN PATENT DOCUMENTS

| | | |
|---|---|---|
| DE | 10 2016 100 207 A1 | 7/2016 |
| EP | 2 762 770 A1 | 8/2014 |
| JP | 2016-207351 A | 12/2016 |

\* cited by examiner

VEHICULAR LAMP WITH ELONGATED LIGHT GUIDE PORTIONS

This application claims the priority benefit under 35 U.S.C. § 119 of Japanese Patent Application No. 2018-137948 filed on Jul. 23, 2018, which is hereby incorporated in its entirety by reference.

TECHNICAL FIELD

The presently disclosed subject matter relates to a vehicular lamp, and more particularly, to a vehicular lamp capable of causing a plurality of light guide portions to output light without using a plurality of light sources.

BACKGROUND ART

Conventionally, there has been known a vehicular lamp including a plurality of long light guide portions and a plurality of light sources for emitting light to be guided in the light guide portions. Examples of such a vehicular lamp may include those disclosed in Japanese Patent Application Laid-Open No. 2016-207351. The light from each of the light sources is guided through the light guide portion provided corresponding to the light source, and is outputted from the light output surface of the light guide portion, so that the light guide portions project light.

However, the vehicular lamp disclosed in Japanese Patent Application Laid-Open No. 2016-207351 has a problem in that a plurality of light sources must be used to output light from a plurality of light guide portions, which causes an increase in cost.

SUMMARY

The presently disclosed subject matter was devised in view of these and other problems and features in association with the conventional art. According to an aspect of the presently disclosed subject matter, there is provided a vehicular lamp capable of causing a plurality of light guide portions to output light without using a plurality of light sources.

According to another aspect of the presently disclosed subject matter, a vehicular lamp includes: a light guide body; and a light source configured to emit light to be guided through the light guide body. Here, the light guide body includes a first light guide portion, a second light guide portion, a light incident portion, a first reflective surface, and a second reflective surface. The first light guide portion is a long light guide body portion including a front surface and a back surface opposite to the front surface and extending from a proximal end portion thereof to a distal end portion thereof, and the second light guide portion is a long light guide body portion including a front surface and a back surface opposite to the front surface and extending from a proximal end portion thereof to a distal end portion thereof. The first light guide portion and the second light guide portion are disposed side by side. The light incident portion includes a light incident surface that faces the light source. The first reflective surface is disposed between the light incident portion and the proximal end portion of the first light guide portion, and the second reflective surface is disposed between the light incident portion and the proximal end portion of the second light guide portion. Of the light having entered the light incident portion through the light incident surface, light internally reflected by the first reflective surface is guided in the first light guide portion from the proximal end portion to the distal end portion of the first light guide portion while being repeatedly totally reflected between the front surface and the back surface of the first light guide portion, and light internally reflected by the second reflective surface is guided in the second light guide portion from the proximal end portion to the distal end portion of the second light guide portion while being repeatedly totally reflected between the front surface and the back surface of the second light guide portion. Further, the back surface of the first light guide portion includes a plurality of first structures configured to cause the light which is being guided in the first light guide portion to exit from the front surface of the first light guide portion, and the back surface of the second light guide portion includes a plurality of second structures configured to cause the light which is being guided in the second light guide portion to exit from the front surface of the second light guide portion.

According to this aspect, it is possible to provide a vehicular lamp capable of causing the first light guide portion and the second light guide portion to output light without using a plurality of light sources.

This is because the light guide body includes the first reflective surface configured to distribute the light that has been emitted from the light source and entered the light incident portion from the light incident surface to the first light guide portion and the second reflective surface configured to distribute the light to the second light guide portion.

In the aforementioned vehicular lamp according to the foregoing aspect, as a preferable aspect, the plurality of first structures may be a plurality of lens cuts coarsely arranged so that the first light guide portion outputs light in a dot shape, and the plurality of second structures may be a plurality of lens cuts densely arranged so that the second light guide lens portion outputs light in a line shape.

According to this aspect, both the dot-shaped surface emission and the line-shaped emission can be achieved simultaneously.

Further, in the aforementioned vehicular lamp according to the foregoing aspect, as a preferable aspect, the surface of the first light guide portion and the surface of the second light guide portion may be arranged so as to intersect each other.

According to this aspect, since the first light guide portion and the second light guide portion are connected without any wasteful portion, the dot-shaped surface emission and the line-shaped emission are not separated from each other and a light emission appearance with a sense of unity can be realized.

Further, in the aforementioned vehicular lamp according to the foregoing aspect, as a preferable aspect, at least one of the surface of the first light guide portion and the surface of the second light guide portion may be any of a flat surface and a curved surface.

According to this aspect, it is possible to realize an appearance in which at least one of the surface of the first light guide portion and the surface of the second light guide portion is a flat surface or a curved surface.

Further, in the aforementioned vehicular lamp according to the foregoing aspect, as a preferable aspect, a concave portion may be formed between the first light guide portion and the second light guide portion.

According to this aspect, since the light directed to the outside of the first light guide portion is internally reflected by the concave portion and guided inside the first light guide portion again, the light outputted from the surface of the first light guide portion can be increased as compared with the case where the concave portion is not formed. Similarly, since the light directed to the outside of the second light guide portion is internally reflected by the concave portion and guided inside the second light guide portion again, the light outputted from the surface of the second light guide portion can be increased as compared with the case where the concave portion is not formed.

Further, in the aforementioned vehicular lamp according to the foregoing aspect, as a preferable aspect, the first light guide portion may be configured to have a thickness thinner than that of the light incident portion, and the light guide body may further include a third reflective surface. Herein, the third reflective surface may be disposed in an inclined orientation between the light incident portion and the proximal end portion of the first light guide portion so that light that has been internally reflected by the first reflective surface and then by the third reflective surface is guided in the first light guide portion from the proximal end portion to the distal end portion of the first light guide portion while being repeatedly totally reflected between the front surface and the back surface of the first light guide portion.

According to this aspect, even if the thickness of the first light guide portion is made thinner than the thickness of the light incident portion, light that has been emitted from the light source and entered the light incident portion can be efficiently caused to enter the first light guide portion.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1:
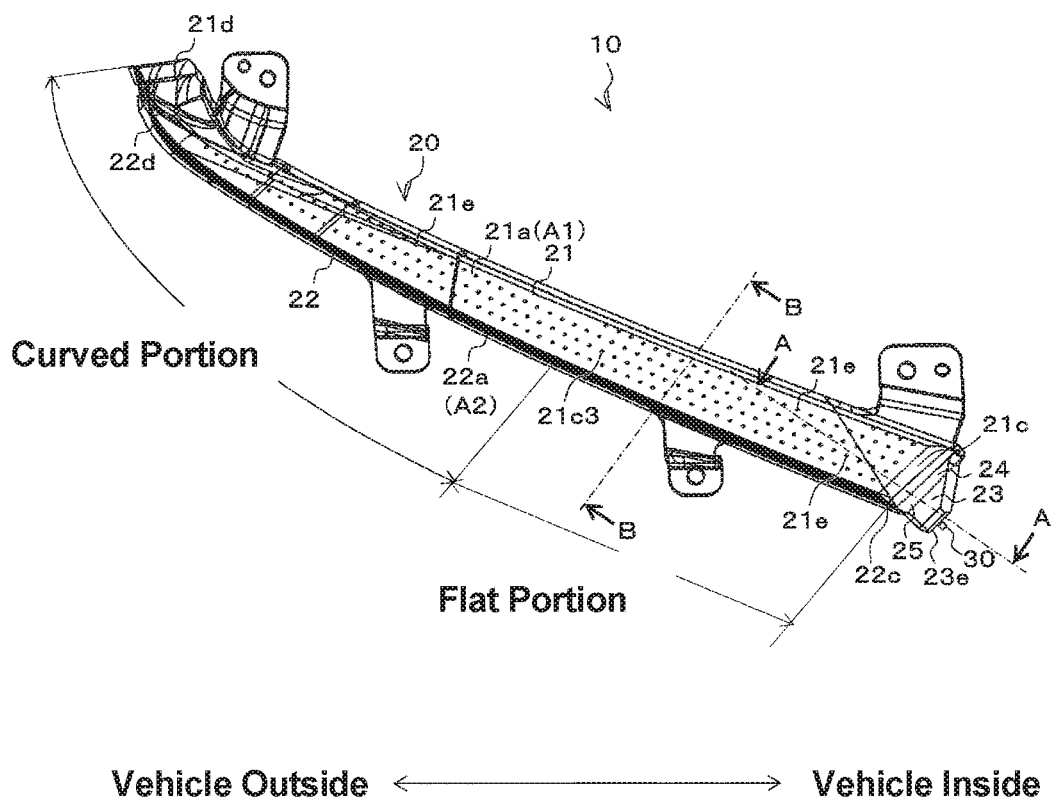
FIG. 1 is a perspective view of a vehicular lamp made in accordance with principles of the presently disclosed subject matter.

A description will now be made below to vehicular lamps of the presently disclosed subject matter with reference to the accompanying drawings in accordance with exemplary embodiments. Components corresponding to each other in the respective drawings are denoted by the same reference numerals, and a repetitive description thereof will be omitted.

Figure 2:
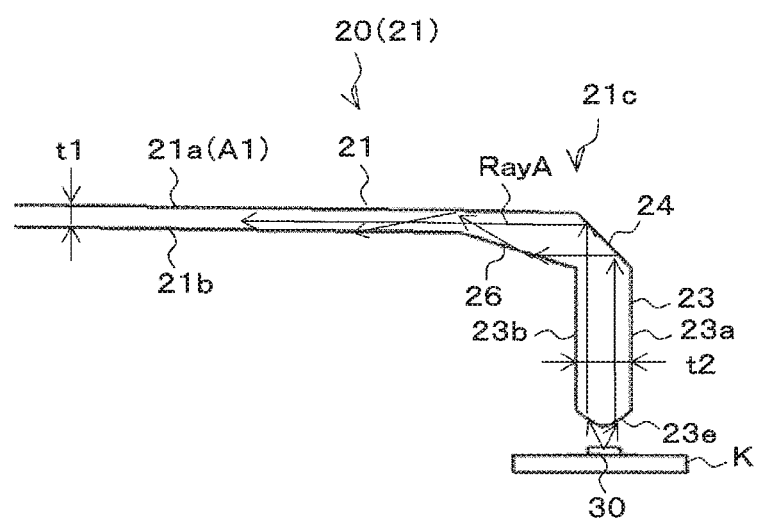
FIG. 2 is a cross-sectional view of the vehicular lamp 10 taken along line A-A in FIG. 1.
Figure 3:
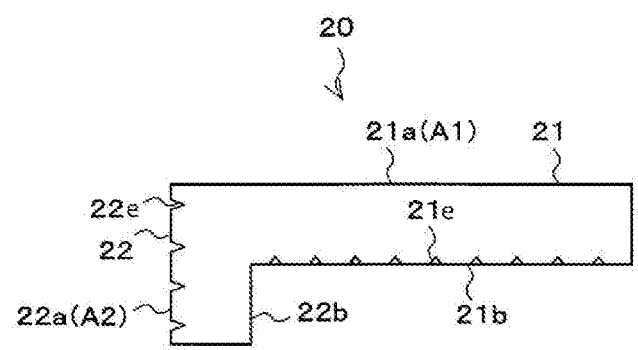
FIG. 3 is a cross-sectional view of the vehicular lamp 10 taken along line B-B in FIG. 1.

FIG. 1 is a perspective view of a vehicular lamp 10, FIG. 2 is a cross-sectional view of the vehicular lamp 10 taken along line A-A in FIG. 1, and FIG. 3 is a cross-sectional view of the vehicular lamp 10 taken along line B-B in FIG. 1.

In this exemplary embodiment, the vehicular lamp 10 illustrated in FIGS. 1 to 3 can be a sign lamp (or signal lamp) functioning as a DRL lamp, and may be mounted on both left and right sides of a front end portion of a vehicle body such as an automobile. Since the vehicular lamp 10 mounted on both the left and right sides has a symmetrical configuration, the vehicular lamp 10 mounted on the right side of the front end of a vehicle body (i.e., the right side toward the front of the vehicle) will be described below as a representative.

As shown in FIG. 1, the vehicular lamp 10 includes a dot-shaped surface emission region A1 that emits light in a dot shape and a line-shaped emission region A2 that emits light in a line shape. The vehicular lamp 10 may be attached to a vehicle body in a state in which the dot-shaped surface emission region A1 faces upward and the line-shaped emission region A2 faces forward. The dot-shaped surface emission region A1 is constituted by a first light guide portion 21 (surface 21a), and the line-shaped emission region A2 is constituted by a second light guide portion 22 (surface 22a), both of which will be described later.

The vehicular lamp 10 can include a light guide body 20, and a light source 30 configured to emit light to be guided through the light guide body 20. Although not illustrated, the vehicular lamp 10 can be disposed in a lamp chamber formed by an outer lens and a housing, and attached to the housing or the like as in common vehicular lamps.

As illustrated in FIG. 1, the light guide body 20 can include the first light guide portion 21 (dot-shaped surface emission portion), the second light guide portion 22 (line-shaped emission portion), a light incident portion 23, a first reflective surface 24, and a second reflective surface 25. The light guide body 20 may be formed by injection molding a transparent resin such as an acrylic resin or a polycarbonate resin. The first light guide portion 21 and the second light guide portion 22 are disposed side by side.

The first light guide portion 21 is a long light guide body portion that includes a front surface 21a and a back surface 21b opposite to the front surface 21a (see FIGS. 2 and 3), and extends from a proximal end portion 21c to a distal end portion 21d (see FIG. 1). The front surface 21a and the back surface 21b of the first light guide portion 21 may be a surface having a flat plane shape or a curved shape and arranged in parallel with each other.

The proximal end portion 21c of the first light guide portion 21 may be disposed on the inner side of the vehicle body, and the distal end portion 21d thereof may be disposed on the outer side of the vehicle body. The first light guide portion 21 may be disposed so that the plate thickness direction is substantially vertical, as illustrated in FIGS. 2 and 3.

The back surface 21b of the first light guide portion 21 includes a plurality of first structures 21e (see FIG. 1) configured to cause light that is being guided in the first light guide portion 21 to exit from the front surface 21a. The first structure 21e may be, for example, a conical lens cut. The first structures 21e are coarsely arranged so that the first light guide portion 21 outputs light in a dot shape.

As illustrated in FIG. 2, the first light guide portion 21 is configured to have a thickness t1 thinner than a thickness t2 of the light incident portion 23 from the viewpoint of reducing the material cost.

As illustrated in FIG. 3, the second light guide portion 22 is formed to extend downward from the front end portion of the first light guide portion 21.

The second light guide portion 22 is a long light guide body portion that includes a front surface 22a and a back surface 22b opposite to the front surface 22a (see FIG. 3), and extends from a proximal end portion 22c to a distal end portion 22d (see FIG. 1). The front surface 22a and the back surface 22b of the second light guide portion 22 may be a surface including a flat portion and a curved portion (see FIG. 1) and arranged in parallel with each other. Although not illustrated, the front surface 22a and the back surface 22b of the second light guide portion 22 each may include only a flat portion or may include only a curved portion.

The proximal end portion 22c of the second light guide portion 22 may be disposed on the inner side of the vehicle body, and the distal end portion 22d thereof may be disposed on the outer side of the vehicle body. The second light guide portion 22 may be disposed so that the plate thickness direction is substantially horizontal (in the front-rear direction of the vehicle) (see FIG. 3). That is, the surface 21a of the first light guide portion 21 and the surface 22a of the second light guide portion 22 are arranged so as to intersect each other, for example, so as to be orthogonal to each other.

The back surface 22b of the second light guide portion 22 includes a plurality of second structures 22e configured to cause light that is being guided in the second light guide portion 22 to exit from the front surface 22a of the second light guide portion 22. The second structure 22e may be, for example, a lens cut such as a V groove. The second structures 22e are densely arranged so that the second light guide portion 22 outputs light in a line shape. The angle of the lens cut, for example, the angle of the V groove, is adjusted so that the light exiting from the surface 22a forms a DRL light distribution pattern.

Figure 4:
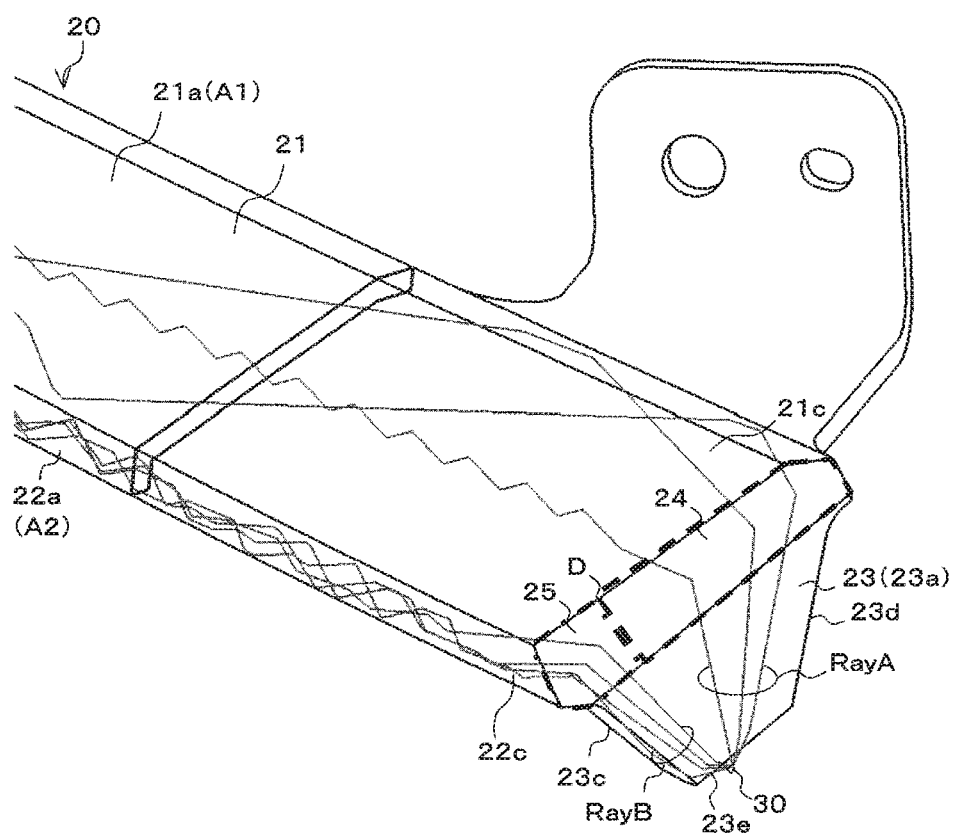
FIG. 4 is a partially enlarged perspective view of the vehicular lamp 10.

As illustrated in FIGS. 2 and 4, the light incident portion 23 is formed to extend downward from the proximal end portion 21c of the first light guide portion 21 (and the proximal end portion 22c of the second light guide portion 22).

FIG. 4 is a partially enlarged perspective view of the vehicular lamp 10.

As illustrated in FIGS. 2 and 4, the light incident portion 23 is a plate-shaped light guide body including a front surface 23a, a back surface 23b opposite to the front surface 23a, side surfaces 23c and 23d, and a light incident surface 23e which faces the light source 30. The light incident portion 23 is configured such that the distance between the side surfaces 23c and 23d becomes wider from the lower portion to the upper portion.

The light incident surface 23e may be a surface that can condense light, which is emitted from the light source 30 and is to enter the light incident portion 23 therethrough, in the plate thickness direction of the light incident portion 23 (see FIG. 2), for example, a cylindrical surface.

The thickness t2 (see FIG. 2) of the light incident portion 23 is greater than the thickness t1 of the first light guide portion 21. Therefore, the light incident portion 23 can efficiently take in the light from the light source 30 as compared to a case where light is assumed to directly enter the thin light guide portion.

The first reflective surface 24 is a reflective surface that can internally reflect (totally reflects) the light from the light source 30 that has entered the light incident portion 23 through the light incident surface 23e and distribute the light to the first light guide portion 21. As illustrated in FIGS. 2 and 4, the first reflective surface 24 is disposed between the light incident portion 23 (front surface 23a) and the proximal end portion 21c (front surface 21a) of the first light guide portion 21. Specifically, the first reflective surface 24 may be disposed in an inclined orientation between the light incident portion 23 (front surface 23a) and the proximal end portion 21c (front surface 21a) of the first light guide portion 21 so that light RayA from the light source 30 which has entered the light incident portion 23 through the light incident surface 23e and been internally reflected by the first reflective surface 24 is guided in the first light guide portion 21 from the proximal end portion 21c of the first light guide portion 21 to the distal end portion 21d while being repeatedly totally reflected between the front surface 21a and the back surface 21b of the first light guide portion 21.

In this case, although the first reflective surface 24 may be a flat surface or a surface having a flat shape, the first reflective surface 24 is preferably configured, for example, as a curved surface slightly convex toward the first light guide portion 21 so that the light from the light source 30 that has been internally reflected by the first reflective surface 24 is repeatedly totally reflected between the front surface 21a and the back surface 21b of the first light guide portion 21.

The second reflective surface 25 is a reflective surface that can internally reflect the light from the light source 30 that has entered the light incident portion 23 through the light incident surface 23e and distribute the light to the second light guide portion 22. As illustrated in FIG. 4, the second reflective surface 25 is disposed between the light incident portion 23 and the proximal end portion 22c of the second light guide portion 22. Specifically, the second reflective surface 25 may be disposed in an inclined orientation between the light incident portion 23 and the proximal end portion 22c of the second light guide portion 22 so that light RayB from the light source 30 which has entered the light incident portion 23 through the light incident surface 23e and been internally reflected by the second reflective surface 25 is guided in the second light guide portion 22 from the proximal end portion 22c of the second light guide portion 22 to the distal end portion 22d while being repeatedly totally reflected between the front surface 22a and the back surface 22b of the second light guide portion 22.

The second reflective surface 25 is, for example, a flat surface or a surface having a flat shape.

It should be noted that the first reflective surface 24 and the second reflective surface 25 can be connected by a smooth curved surface D (see FIG. 4) without a step.

In the present exemplary embodiment, as illustrated in FIG. 2, the vehicular lamp 10 may further include a third reflective surface 26. The third reflective surface 26 is a reflective surface configured to internally reflect light having been reflected from the first reflective surface 24, and is disposed between the light incident portion 23 (back surface 23b) and the proximal end portion 21c (back surface 21b) of the first light guide portion 21. Specifically, the third reflective surface 26 is disposed in an inclined orientation between the light incident portion 23 (back surface 23b) and the proximal end portion 21c (back surface 21b) of the first light guide portion 21 so that light that has been internally reflected by the first reflective surface 24 and then by the third reflective surface 26 is guided in the first light guide portion 21 from the proximal end portion 21c to the distal end portion 21d of the first light guide portion 21 while being repeatedly totally reflected between the front surface 21a and the back surface 21b of the first light guide portion 21.

The third reflective surface 26 may be, for example, a flat surface or a surface having a flat shape.

By providing the third reflecting surface 26, even if the thickness t1 of the first light guide portion 21 is made thinner than the thickness t2 of the light incident portion 23, the light that has been emitted from the light source 30 and entered the light entering portion 23 can be efficiently caused to enter the first light guide portion 21.

The light source 30 may be a semiconductor light-emitting element such as an LED or LD having a rectangular light-emitting surface, for example, a 1 mm square, and may be mounted on a substrate K with the light-emitting surface facing upward as illustrated in FIG. 2. The substrate K may be attached to a housing (not shown) or the like by screwing or the like.

In the vehicular lamp 10 having the aforementioned configuration, when the light source 30 is turned on, the light emitted from the light source 30 can enter the light incident portion 23 through the light incident surface 23e.

Of the light from the light source 30 having entered the light incident portion 23 through the light incident surface 23e, the light RayA (see FIG. 4) having been internally reflected by the first reflecting surface 24 (and the third reflecting surface 26) can be guided in the first light guide portion 21 from the proximal end portion 21c of the first light guide portion 21 toward the distal end portion 21d while being repeatedly totally reflected between the front surface 21a and the back surface 21b of the first light guide portion 21. During the travelling of light within the first light guide portion 21, part of the light is internally reflected (diffusely reflected) by the first structures 21e (not shown in FIG. 4, but see FIG. 2), and is outputted from the front surface 21a of the first light guide portion 21. As a result, the first light guide portion 21 projects light in a dot shape (or dot-shaped light can be observed from the front surface 21a of the first light guide portion 21).

On the other hand, of the light from the light source 30 having entered the light incident portion 23 through the light incident surface 23e, the light RayB (see FIG. 4) having been internally reflected by the second reflecting surface 25 can be guided in the second light guide portion 22 from the proximal end portion 22c of the second light guide portion 22 toward the distal end portion 22d while being repeatedly totally reflected between the front surface 22a and the back surface 22b of the second light guide portion 22. During the travelling of light within the second light guide portion 22, part of the light is internally reflected (diffusely reflected) by the second structures 22e, and is outputted from the front surface 22a of the second light guide portion 22. As a result, the second light guide portion 22 projects light in a line shape (or line-shaped light can be observed from the front surface 22a of the second light guide portion 22). The DRL light distribution pattern is formed by the light emitted from the surface 22a of the second light guide portion 22.

As described above, according to the present exemplary embodiment, it is possible to provide the vehicular lamp 10 capable of outputting light both from the first light guide portion 21 and the second light guide portion 22 without using a plurality of light sources, meaning that the dot-shaped surface emission and line-shaped emission can be achieved simultaneously.

This is because the light guide body 20 includes the first reflective surface 24 configured to distribute the light from the light source 30, which has entered the light incident portion 23 from the light incident surface 23e, to the first light guide portion 21 and the second reflective surface 25 configured to distribute the light to the second light guide portion 22.

In addition, according to the present exemplary embodiment, since the first light guide portion 21 (dot-shaped surface emission portion) and the second light guide portion 22 (line-shaped emission portion) are connected without any wasteful portion, the dot-shaped surface emission and the line-shaped emission are not separated and a light emission appearance with a sense of unity can be realized.

Next, modifications will be described.

In the above-described exemplary embodiment, an example has been described in which two light guide portions, i.e., the first light guide portion 21 and the second light guide portion 22, are adopted as the light guide body portions, and two reflective surfaces, i.e., the first reflective surface 24 and the second reflective surface 25, are adopted as the reflective surfaces configured to distribute the light from the light source 30 having entered the light incident portion 23 to the light guide portions, i.e., the first light guide portion 21 and the second light guide portion 22; however, the presently disclosed subject matter is not limited thereto.

For example, three or more light guide portions may be used as the light guide portion, and three or more reflective surfaces may be used as reflective surfaces configured to distribute the light from the light source 30 that has entered the light incident portion 23 to the respective light guide portions (three or more light guide portions).

In the above-described embodiment, an example in which a conical lens cut is used as the first structure and a lens cut such as a V-groove is used as the second structure has been described; however, the presently disclosed subject matter is not limited thereto. For example, a polygonal pyramid lens cut such as a quadrangular pyramid, a hemispherical lens cut, or another lens cut may be used as the first structure. As the second structure, a lens cut other than the V-groove may be used. In addition, a lens cut such as a V-groove may be used as the first structure, and a conical lens cut or the like may be used as the second structure.

FIGS. 5A to 5C and 6A to 6B are cross-sectional views of the vehicular lamp 10 taken along line B-B in FIG. 1. Note that the first structures and the second structures are not illustrated in these drawings in order to clearly show the shapes of the first light guide portion 21 and the second light guide portion 22.

Figure 5A:
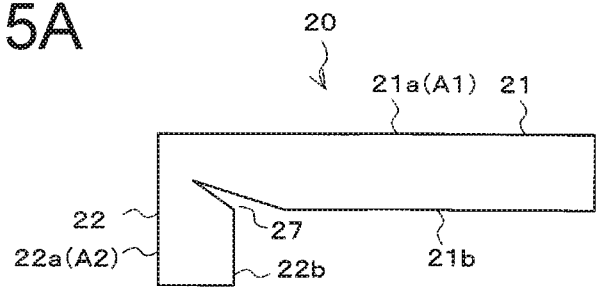
FIGS. 5A to 5C are each a cross-sectional view of the vehicular lamp 10 (modification) taken along line B-B in FIG. 1.

For example, as shown in FIG. 5A, a concave portion 27 may be formed between the first light guide portion 21 and the second light guide portion 22. The concave portion 27 extends while being juxtaposed with the first light guide portion 21 and the second light guide portion 22. With this configuration, since the light directed to the outside of the first light guide portion 21 is internally reflected by the concave portion 27 and guided inside the first light guide portion 21 again, it is possible to increase the light outputted from the surface 21a of the first light guide portion 21 as compared with the case where the concave portion 27 is not formed. Similarly, since the light directed to the outside of the second light guide portion 22 is internally reflected by the concave portion 27 and guided inside the second light guide portion 22 again, it is possible to increase the light outputted from the surface 22a of the second light guide portion 22 as compared with the case where the concave portion 27 is not formed.

Figure 5B:
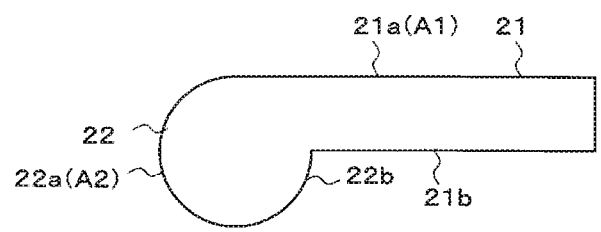

As illustrated in FIG. 5B, the surface 22a of the second light guide portion 22 may be a curved surface. Although not illustrated, the same applies to the surface 21a of the first light guide portion 21.

Figure 5C:
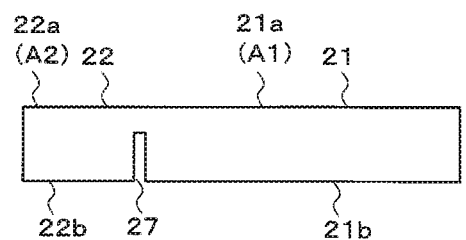

Further, as illustrated in FIG. 5C, the surface 21a of the first light guide portion 21 and the surface 22a of the second light guide portion 22 may be arranged in a form that does not intersect each other (e.g., formed on the same plane). In this case, it is desirable to form the concave portion 27 between the first light guide portion 21 and the second light guide portion 22.

Figure 6A:
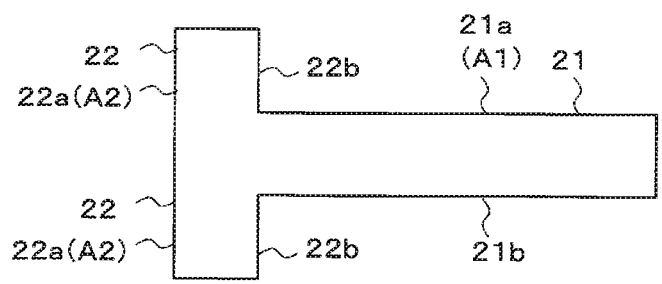
FIGS. 6A and 6B are each a cross-sectional view of the vehicular lamp 10 (modification) taken along line B-B in FIG. 1.
Figure 6B:
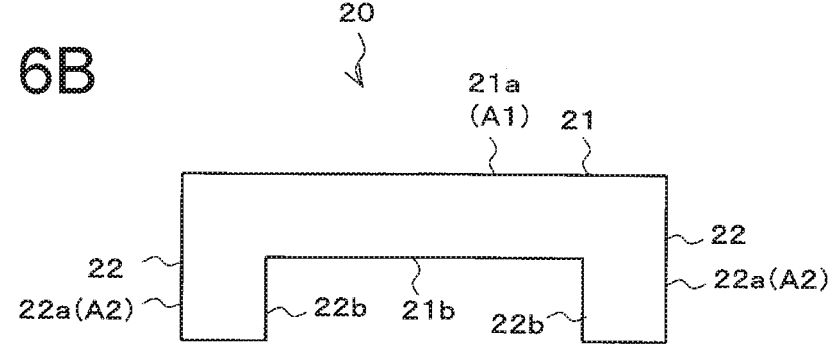

As shown in FIGS. 6A and 6B, a plurality of second light guide portions 22 may be used.

In the above-described exemplary embodiment, an example in which the vehicular lamp of the presently disclosed subject matter is applied to a DRL lamp has been described, but the presently disclosed subject matter is not limited thereto. For example, the presently disclosed subject matter may be applied to vehicular lamps other than DRL lamps such as a turn-signal lamp, a position lamp, a tail lamp, a stop lamp, and a fog lamp.

The numerical values shown in the above-described exemplary embodiment(s) and modification(s) are illustrative, and it is needless to say that appropriate numerical values different from these can be used.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicular lamp comprising:
    a light guide body; and
    a light source configured to emit light to be guided through the light guide body, wherein
    the light guide body includes a first light guide portion, a second light guide portion, a light incident portion, a first reflective surface, and a second reflective surface,
    the first light guide portion has a linear elongated light guide body shape including a front surface and a back surface opposite to the front surface and extending from a proximal end portion thereof to a distal end portion thereof,
    the second light guide portion has a linear elongated light guide body shape including a front surface and a back surface opposite to the front surface and extending from a proximal end portion thereof to a distal end portion thereof,
    the first light guide portion and the second light guide portion are disposed side by side to be connected to each other,
    the light incident portion includes a light incident surface that faces the light source,
    the first reflective surface is disposed between the light incident portion and the proximal end portion of the first light guide portion,
    the second reflective surface is disposed between the light incident portion and the proximal end portion of the second light guide portion,
    of the light having entered the light incident portion through the light incident surface, light totally internally reflected by the first reflective surface is guided in the first light guide portion from the proximal end portion to the distal end portion of the first light guide portion while being repeatedly totally internally reflected between the front surface and the back surface of the first light guide portion, and light internally reflected by the second reflective surface is guided in the second light guide portion from the proximal end portion to the distal end portion of the second light guide portion while being repeatedly totally reflected between the front surface and the back surface of the second light guide portion,
    the back surface of the first light guide portion includes a plurality of first structures configured to cause the light which is being guided in the first light guide portion to exit from the front surface of the first light guide portion,
    the back surface of the second light guide portion includes a plurality of second structures configured to cause the light which is being guided in the second light guide portion to exit from the front surface of the second light guide portion, and
    the surface of the first light guide portion and the surface of the second light guide portion are arranged so as to intersect each other.

2. The vehicular lamp according to claim 1, wherein
    the plurality of first structures is a plurality of lens cuts arranged so that the first light guide portion outputs light in a dot shape, and
    the plurality of second structures is a plurality of lens cuts arranged so that the second light guide portion outputs light in a line shape.

3. The vehicular lamp according to claim 2, wherein
    the first light guide portion is configured to have a thickness thinner than that of the light incident portion,
    the light guide body includes a third reflective surface, and
    the third reflective surface is disposed in an inclined orientation between the light incident portion and the proximal end portion of the first light guide portion so that light that has been totally internally reflected by the first reflective surface and then by the third reflective surface is guided in the first light guide portion from the proximal end portion to the distal end portion of the first light guide portion while being repeatedly totally reflected between the front surface and the back surface of the first light guide portion.

4. The vehicular lamp according to claim 2, wherein at least one of the surface of the first light guide portion and the surface of the second light guide portion is any of a flat surface and a curved surface.

5. The vehicular lamp according to claim 2, wherein a concave portion is formed between the first light guide portion and the second light guide portion.

6. The vehicular lamp according to claim 1, wherein at least one of the surface of the first light guide portion and the surface of the second light guide portion is any of a flat surface and a curved surface.

7. The vehicular lamp according to claim 6, wherein a concave portion is formed between the first light guide portion and the second light guide portion.

8. The vehicular lamp according to claim 6, wherein
    the first light guide portion is configured to have a thickness thinner than that of the light incident portion,
    the light guide body includes a third reflective surface, and
    the third reflective surface is disposed in an inclined orientation between the light incident portion and the proximal end portion of the first light guide portion so that light that has been totally internally reflected by the first reflective surface and then by the third reflective surface is guided in the first light guide portion from the proximal end portion to the distal end portion of the first light guide portion while being repeatedly totally reflected between the front surface and the back surface of the first light guide portion.

9. The vehicular lamp according to claim 6, wherein the light incident portion is configured such that the light incident portion is configured such that a distance between side surfaces thereof becomes wider from the light incident surface to the proximal end portion of the first light guide portion.

10. The vehicular lamp according to claim 1, wherein a concave portion is formed between the first light guide portion and the second light guide portion.

11. The vehicular lamp according to claim 10, wherein
the first light guide portion is configured to have a thickness thinner than that of the light incident portion,
the light guide body includes a third reflective surface, and
the third reflective surface is disposed in an inclined orientation between the light incident portion and the proximal end portion of the first light guide portion so that light that has been totally internally reflected by the first reflective surface and then by the third reflective surface is guided in the first light guide portion from the proximal end portion to the distal end portion of the first light guide portion while being repeatedly totally reflected between the front surface and the back surface of the first light guide portion.

12. The vehicular lamp according to claim 10, wherein the light incident portion is configured such that the light incident portion is configured such that a distance between side surfaces thereof becomes wider from the light incident surface to the proximal end portion of the first light guide portion.

13. The vehicular lamp according to claim 1, wherein the light incident portion is configured such that the light incident portion is configured such that a distance between side surfaces thereof becomes wider from the light incident surface to the proximal end portion of the first light guide portion.

14. A vehicular lamp comprising:
a light guide body; and
a light source configured to emit light to be guided through the light guide body, wherein
the light guide body includes a first light guide portion, a second light guide portion, a light incident portion, a first reflective surface, and a second reflective surface,
the first light guide portion has an elongated light guide body shape including a front surface and a back surface opposite to the front surface and extending from a proximal end portion thereof to a distal end portion thereof,
the second light guide portion has an elongated light guide body shape including a front surface and a back surface opposite to the front surface and extending from a proximal end portion thereof to a distal end portion thereof,
the first light guide portion and the second light guide portion are disposed side by side,
the light incident portion includes a light incident surface that faces the light source,
the first reflective surface is disposed between the light incident portion and the proximal end portion of the first light guide portion,
the second reflective surface is disposed between the light incident portion and the proximal end portion of the second light guide portion,
of the light having entered the light incident portion through the light incident surface, light totally internally reflected by the first reflective surface is guided in the first light guide portion from the proximal end portion to the distal end portion of the first light guide portion while being repeatedly totally internally reflected between the front surface and the back surface of the first light guide portion, and light internally reflected by the second reflective surface is guided in the second light guide portion from the proximal end portion to the distal end portion of the second light guide portion while being repeatedly totally reflected between the front surface and the back surface of the second light guide portion,
the back surface of the first light guide portion includes a plurality of first structures configured to cause the light which is being guided in the first light guide portion to exit from the front surface of the first light guide portion, and
the back surface of the second light guide portion includes a plurality of second structures configured to cause the light which is being guided in the second light guide portion to exit from the front surface of the second light guide portion
and wherein
the first light guide portion is configured to have a thickness thinner than that of the light incident portion,
the light guide body includes a third reflective surface, and
the third reflective surface is disposed in an inclined orientation between the light incident portion and the proximal end portion of the first light guide portion so that light that has been totally internally reflected by the first reflective surface and then by the third reflective surface is guided in the first light guide portion from the proximal end portion to the distal end portion of the first light guide portion while being repeatedly totally reflected between the front surface and the back surface of the first light guide portion.

15. The vehicular lamp according to claim 14, wherein the surface of the first light guide portion and the surface of the second light guide portion are arranged so as to intersect each other.

* * * * *